United States Patent
Ho

(10) Patent No.: US 8,407,717 B2
(45) Date of Patent: Mar. 26, 2013

(54) PARALLEL PROCESSING METHOD FOR DUAL OPERATING SYSTEM

(75) Inventor: Wen Chih Ho, Banciao (TW)

(73) Assignees: Insyde Software Corporation, Taipei (TW); Acer Incorporated, Taipei Hsien (TW)

( * ) Notice: Subject to any disclaimer, the term of this patent is extended or adjusted under 35 U.S.C. 154(b) by 449 days.

(21) Appl. No.: 12/722,419

(22) Filed: Mar. 11, 2010

(65) Prior Publication Data

US 2010/0319008 A1 Dec. 16, 2010

(30) Foreign Application Priority Data

Jun. 11, 2009 (TW) .............................. 98119512 A

(51) Int. Cl.
*G06F 13/00* (2006.01)
(52) U.S. Cl. ....................................... 719/312; 719/319
(58) Field of Classification Search .................. 719/321, 719/319
See application file for complete search history.

(56) References Cited

U.S. PATENT DOCUMENTS

| 7,941,813 B1* | 5/2011 | Protassov et al. ............. 719/321 |
| 2005/0086517 A1* | 4/2005 | Willman et al. .............. 713/200 |
| 2010/0153924 A1* | 6/2010 | Andrews ....................... 717/126 |

* cited by examiner

*Primary Examiner* — Andy Ho
(74) *Attorney, Agent, or Firm* — Muncy, Geissler, Olds & Lowe, PLLC

(57) ABSTRACT

The present invention relates to a parallel processing method for a dual operating system, comprising building a main operating system and a sub operating system on an operating system kernel; executing a first application program in the main operating system and executing a second application program in the sub operating system; the operating system kernel transmitting an instruction or command received from a piece of hardware to the first application program; the first application program converting the instruction or command into program codes to be executed by the second application program; the first application program transmitting the program codes to the second application program; the second application program executing the program codes and saving the executed result in a memory or a file system; the first application program reading the executed result of the second application program from the memory or the file system; and the first application program transmitting the read result to the operating system kernel.

10 Claims, 2 Drawing Sheets

PARALLEL PROCESSING METHOD FOR DUAL OPERATING SYSTEM

FIELD OF THE INVENTION

The present invention relates to a parallel processing method for a dual operating system, and in particular, a parallel processing method for a dual heterogeneous operating system, which is built on a GNU Linux kernel.

BACKGROUND TO THE INVENTION

In the concept of computer working, hardware is a real worker of the computer, and software refers to an operating system kernel, operating system (OS) and application program. The operating system kernel controls the hardware to work correctly, for example, enables a CPU to receive instructions and a hard disk to be accessed. The operating system provides a program developer with the environment for developing application programs on the operating system kernel providing drivers. The application program enables an easier communication between the operating system kernel and the user by providing, for example, text instruction mode, graphic mode, etc.

A test environment for many application programs is integrated with and provided on a server; for example, various operating systems are built on an operating system kernel to test different application environments. For example, there is a main operating system built on a GNU (GNU's not Unix) Linux kernel, and a sub operating system is started in the main operating system; then, a first application program runs in the main operating system and a second application program runs in the sub operating system. Because the main operating system and the sub operating system each are an independent operating system for the GNU Linux kernel, it is necessary to build a virtual machine on the main operating system by using a virtual machine technology to integrate the sub operating system into the main operating system, so that the first application program running in the main operating system and the second application program running in the sub operating system can display their respective results on a same screen even under different operating environments.

However, although a virtual machine can be used to integrate two different operating systems on an operating system kernel, such a method requires a higher hardware specification such as, for example, more memory spaces; also, the CPU loading will increase when the virtual machine is started to execute respective application programs of different operating systems.

SUMMARY OF THE INVENTION

The object of the present invention is to provide a parallel processing method for a dual operating system, capable of, under the condition that no high hardware specification is needed and the CPU loading does not increase, easily integrating the application programs originally executed in a sub operating system into the platform of a main operating system without affecting the original architectures of the two operating systems. Also, the two heterogeneous operating systems commonly built on a GNU Linux kernel can run independently without causing conflict and can share the hardware resources.

According to the first aspect of the present invention, a parallel processing method for a dual operating system is provided, which is adapted to control a piece of hardware of a computer by an operating system kernel, the method comprising the steps of:

building a main operating system and a sub operating system on the operating system kernel;

executing a first application program in the main operating system and executing a second application program in the sub operating system;

the operating system kernel transmitting an instruction or command received from the piece of hardware to the first application program through the main operating system;

the first application program converting the instruction or command into program codes to be executed by the second application program;

the first application program transmitting the program codes to the second application program through the sub operating system;

the second application program executing the program codes and saving the executed result in a memory or a file system through the operating system kernel;

the first application program reading the executed result of the second application program from the memory or the file system, in which the executed result of the second application program is accessed from the memory or the file system by the operating system kernel through the main operating system so as to be read by the first application program; and the first application program transmitting the read result to the operating system kernel through the main operating system.

According to the second aspect of the present invention, in the parallel processing method of the first aspect, the operating system kernel transmits the instruction or command received from the piece of hardware to an input service means of the first application program through the main operating system;

the input service means of the first application program converts the received instruction or command into program codes to be executed by the second application program;

an output service means of the first application program calls the second application program through the sub operating system and transmits the program codes to the second application program through the sub operating system;

the output service means of the first application program reads the executed result of the second application program from the memory or the file system; and the input service means of the first application program transmits the read result to the operating system kernel through the main operating system, and the operating system kernel drives the piece of hardware in accordance with the received result.

According to the third aspect of the present invention, in the parallel processing method of the second aspect, the piece of hardware is a system architecture and peripheral device of the computer.

According to the fourth aspect of the present invention, in the parallel processing method of the second aspect, the operating system kernel is a GNU Linux kernel.

According to the fifth aspect of the present invention, in the parallel processing method of the second aspect, the result of the second application program executing the program codes is in a form of a memory mapping or a file.

According to the sixth aspect of the present invention, a computer readable recording medium having a program recorded thereon is provided. The parallel processing method as defined in any one of the first to fifth aspects can be implemented when the program is loaded into a computer from the recording medium and executed.

According to the seventh aspect of the present invention, a computer program product having a program recorded therein is provided. The parallel processing method as defined in any one of the first to fifth aspects can be implemented when the program is loaded into a computer from the computer program product and executed.

DESCRIPTION OF PREFERRED EMBODIMENTS

A preferred embodiment of the present invention will be described below with reference to the accompanying drawings.

Figure 1:
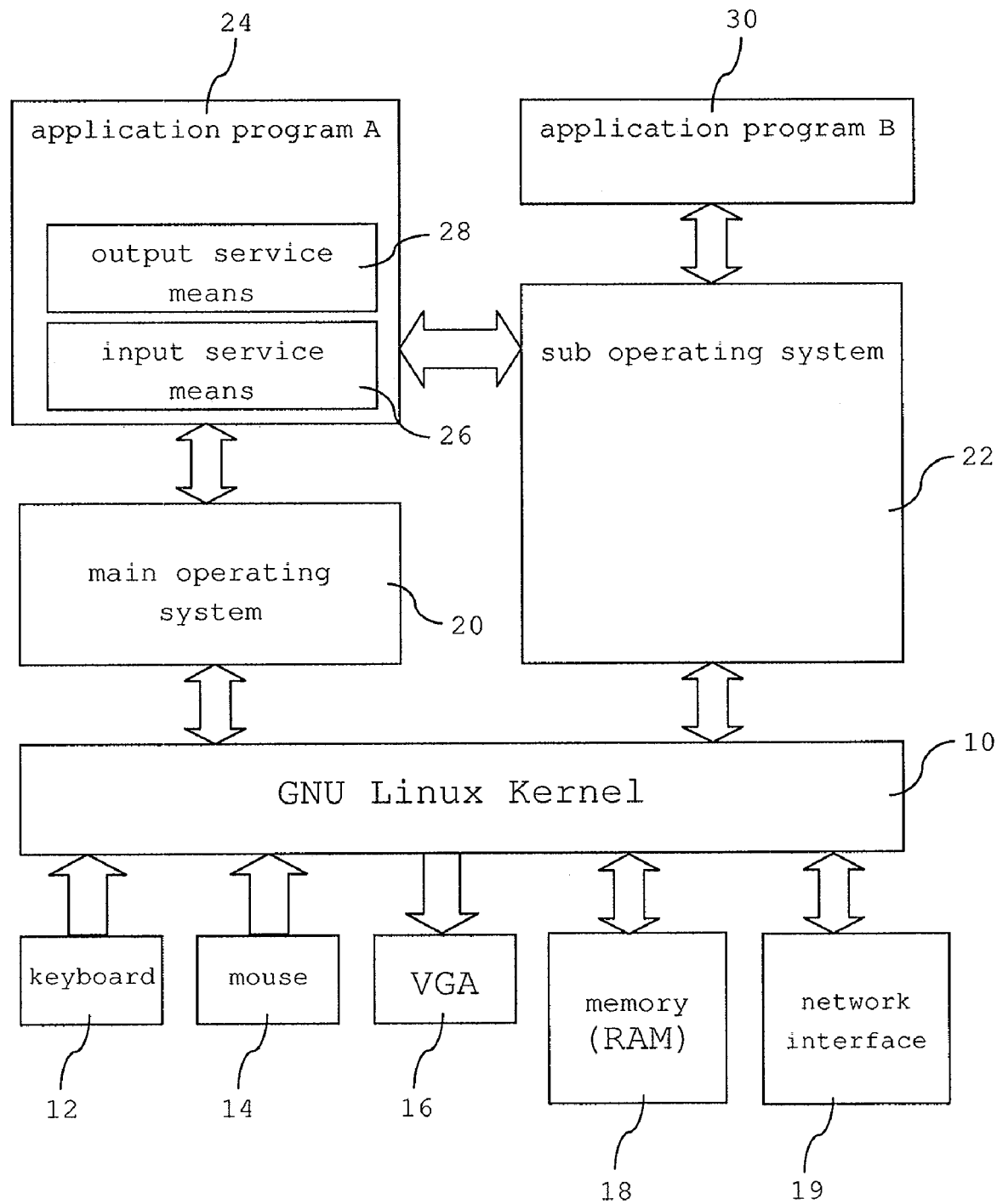
FIG. 1 is a system block chart of the parallel processing method for a dual operating system according to the present invention.

FIG. 1 is a system block chart of the parallel processing method for a dual operating system according to the present invention. In FIG. 1, a GNU Linux kernel 10 as an operating system kernel is tasked with controlling the hardware (a system architecture and peripheral device of a computer) such as, for example, receiving data or commands from a keyboard 12 or mouse 14, transmitting video data to a VGA 16, accessing data in a memory (such as RAM) 18, or transmitting or receiving data via a network interface 19.

A main operating system 20 and a sub operating system 22 are built on the GNU Linux kernel 10. Both operating systems independently run on the GNU Linux kernel 10 without causing, for example, conflict of using hardware resources. The application program A 24 is an application program executed in the main operating system 20, and the application program B 30 is an application program executed in the sub operating system 22.

The GNU Linux kernel 10 transmits the instruction or command received from, for example, the keyboard 12 or mouse 14 to an input service means 26 of the application program A 24 through the main operating system 20. The input service means 26 of the application program A 24 converts the received instruction or command into program codes to be executed by the application program B 30. An output service means 28 of the application program A 24 calls the application program B 30 through the sub operating system 22 and transmits the program codes to the application program B 30 through the sub operating system 22. The output service means 28 of the application program A 24 reads the executed result of the application program B 30 from the memory 18 or the file system, wherein the result of the application program B 30 executing the program codes is in a form of a memory mapping or a file. The input service means 26 of the application program A 24 transmits the read result to the GNU Linux kernel 10 through the main operating system 20, and the GNU Linux kernel 10 transmits the result to an output device such as the VGA 16.

Figure 2:
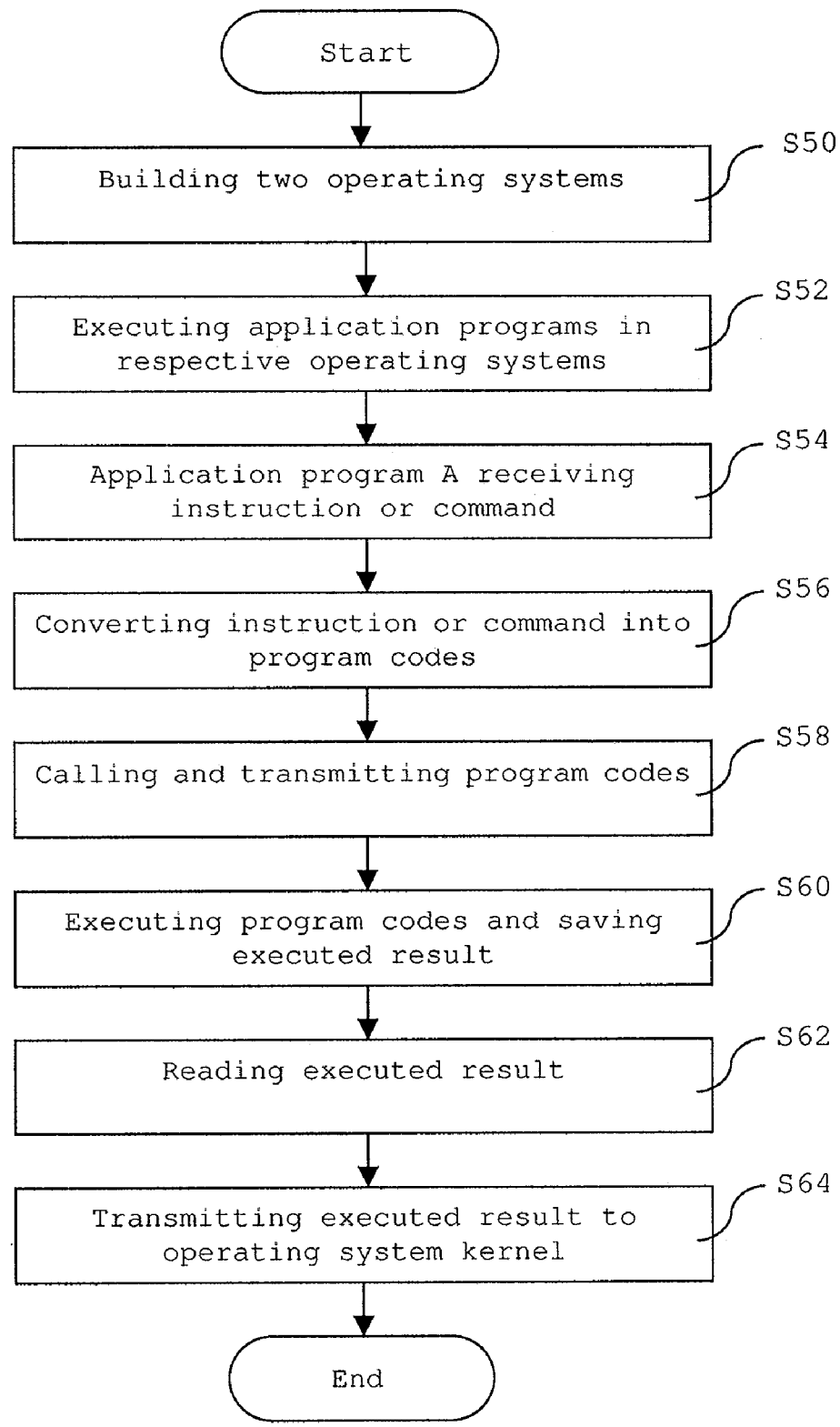
FIG. 2 is a flowchart of the parallel processing method for a dual operating system according to the present invention.

FIG. 2 is a flowchart of the parallel processing method for a dual operating system according to the present invention. The procedure of FIG. 2 is described by referring to the components shown in FIG. 1. To make a clearer description of the applications of the parallel processing method for a dual operating system according to the present invention, the description will be made by replacing each component in FIG. 1 with the component of a well-known operating system.

In addition to being developed as an application of mobile phone software platform, Google Android x86 currently also supports the IBM x86 hardware architecture platform. This embodiment is to execute the Firefox web browser, which is an application program running on Linux X-server, on the Google Android x86 platform. Therefore, Google Android x86 is the main operating system 20 while Linux X-server is the sub operating system 22 and both Google Android x86 and Linux X-server are built on the GNU Linux kernel 10. Also, an application program A 24 comprising the aforementioned input service means 26 and output service means 28 and the program code for calling to execute Firefox is written on Google Android x86. When a user clicks the application program A 24, the Firefox web browser on Linux X-server is started.

In FIG. 2, first, the main operating system 20 of Google Android x86 and the sub operating system 22 of Linux X-server are built on the GNU Linux kernel 10 (Step S50). Google Android x86 and Linux X-server are heterogeneous operating systems, which can independently run on GNU Linux kernel 10 and share the hardware resources.

Next, the application program A 24 is executed in the main operating system 20 of Google Android x86 and the Firefox web browser (i.e. the application program B 30 in FIG. 1) is executed in the sub operating system 22 of Linux X-server (Step S52).

The GNU Linux kernel 10 transmits the instruction or command received from the hardware to the input service means 26 of the application program A 24 through the main operating system 20 of Google Android x86 (Step S54). For example, the user clicks to select a task on the Firefox web browser via the keyboard 12 or mouse 14, and the GNU Linux kernel 10 transmits the instruction or command received from the keyboard 12 or mouse 14 to the input service means 26 of the application program A 24 through the main operating system 20 of Google Android x86.

Then the input service means 26 of the application program A 24 converts the received instruction or command into program codes to be executed by the Firefox web browser (Step S56). Next, the output service means 28 of the application program A 24 calls the Firefox web browser through the sub operating system 22 of Linux X-server and transmits the program codes to the Firefox web browser through the sub operating system 22 of Linux X-server (Step S58).

The Firefox web browser executes the program codes (i.e. executes the task selected in the Firefox web browser by clicking in Step S54) and saves the executed result in the memory 18 or a file system (not shown) through the GNU Linux kernel 10 (Step S60). For example, when the user browses information on some webpage by using the Firefox web browser, the Firefox web browser enables the GNU Linux kernel 10 through the sub operating system 22 of Linux X-server to drive the network interface 19 so as to capture data of the webpage to be browsed from the internet. The GNU Linux kernel 10 saves the data captured by the network interface 19 in the memory 18.

Next, the output service means 28 of the application program A 24 reads the executed result (i.e. the information on the webpage to be browsed) of the Firefox web browser from the memory 18 (or the file system if the executed result is stored in a file form), in which the executed result of the Firefox web browser is accessed from the memory 18 by the GNU Linux kernel 10 through the main operating system 20 of Google Android x86 so as to be read by the application program A 24 (Step S62).

Further, the input service means 26 of the application program A 24 transmits the read result to the GNU Linux kernel 10 through the main operating system 20 of Google Android x86, and the GNU Linux kernel 10 drives the VGA 16 in accordance with the received result (i.e. the information on the webpage to be browsed) so that the information on the webpage to be browsed by the user is displayed in the Firefox web browser (Step S64).

The parallel processing method for a dual operating system according to the present invention as described above can be implemented with a program, and the program can be stored in a computer readable recording medium. The procedural steps as described above and shown in the drawings can be implemented when the program is loaded into a computer from the computer readable recording medium and executed.

Similarly, the parallel processing method for a dual operating system according to the present invention as described above can be implemented with a computer program product. The procedural steps as described above and shown in the drawings can be implemented when the computer program product is, for example, downloaded to a computer from the internet and executed.

The advantage of the present invention is to provide a parallel processing method for a dual operating system, capable of, under the condition that no high hardware specification is needed and the CPU loading does not increase, easily integrating the application programs originally executed in a sub operating system into the platform of a main operating system without affecting the original architectures of the two operating systems. Also, the two heterogeneous operating systems commonly built on a GNU Linux kernel can run independently without causing conflict and can share the hardware resources.

While the present invention has been described above with reference to the preferred embodiment and illustrative drawings, it should not be considered as limited thereby. Various equivalent alterations, omissions and modifications made to its configuration and the embodiment by the skilled persons could be conceived of without departing from the scope of the present invention.

DESCRIPTION OF REFERENCE NUMERALS

10 GNU Linux kernel
12 keyboard
14 mouse
16 VGA
18 memory
19 network interface
20 main operating system
22 sub operating system
24 application program A
26 input service means
28 output service means
30 application program B

What is claimed is:

1. A parallel processing method for a dual operating system, adapted to control a piece of hardware of a computer by an operating system kernel, the method comprising the steps of:
   building a main operating system and a sub operating system on the operating system kernel;
   executing a first application program in the main operating system and executing a second application program in the sub operating system;
   the operating system kernel transmitting an instruction or command received from the piece of hardware to the first application program through the main operating system;
   the first application program converting the instruction or command into program codes to be executed by the second application program;
   the first application program transmitting the program codes to the second application program through the sub operating system;
   the second application program executing the program codes and saving the executed result in a memory or a file system through the operating system kernel;
   the first application program reading the executed result of the second application program from the memory or the file system, in which the executed result of the second application program is accessed from the memory or the file system by the operating system kernel through the main operating system so as to be read by the first application program; and
   the first application program transmitting the read result to the operating system kernel through the main operating system.

2. The parallel processing method according to claim 1, wherein
   the operating system kernel transmits the instruction or command received from the piece of hardware to an input service means of the first application program through the main operating system;
   the input service means of the first application program converts the received instruction or command into program codes to be executed by the second application program;
   an output service means of the first application program calls the second application program through the sub operating system and transmits the program codes to the second application program through the sub operating system;
   the output service means of the first application program reads the executed result of the second application program from the memory or the file system; and
   the input service means of the first application program transmits the read result to the operating system kernel through the main operating system, and the operating system kernel drives the piece of hardware in accordance with the received result.

3. The parallel processing method according to claim 1 or 2, wherein the piece of hardware is a system architecture and peripheral device of the computer.

4. The parallel processing method according to claim 1 or 2, wherein the operating system kernel is a GNU Linux kernel.

5. The parallel processing method according to claim 1 or 2, wherein the result of the second application program executing the program codes is in a form of a memory mapping or a file.

6. A computer readable recording medium having a program recorded thereon, adapted to implement the parallel processing method as defined in any one of claims 1 to 5 when the program is loaded into a computer from the recording medium and executed.

7. A computer program product having a program recorded therein, adapted to implement the parallel processing method as defined in any one of claims 1 to 5 when the program is loaded into a computer from the computer program product and executed.

8. The parallel processing method according to claim 1, wherein input control information of the sub operating system is transmitted through the first application program in the main operating system.

9. The parallel processing method according to claim 1, wherein a display screen of the sub operating system is stored in the memory.

10. The parallel processing method according to claim 1, wherein the main operating system and the sub operating system are not both run on a virtual machine.

* * * * *